April 21, 1931.  J. LEDWINKA  1,801,869
PRESSED METAL AUTOMOBILE BODY
Filed Oct. 20, 1926   3 Sheets-Sheet 2
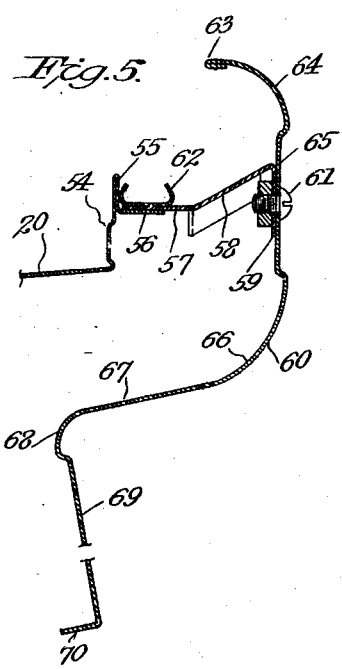
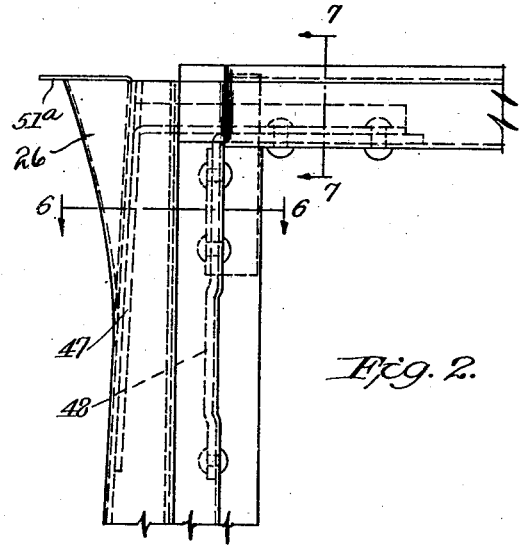
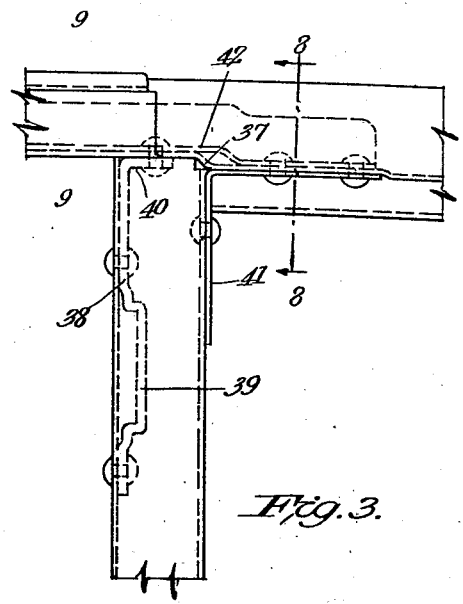
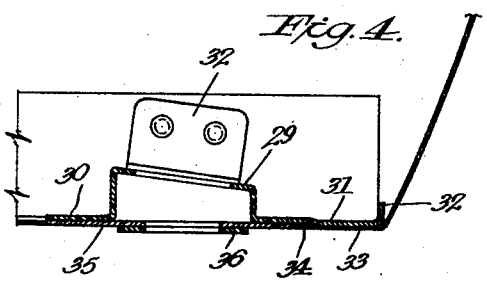
INVENTOR.
JOSEPH LEDWINKA
BY
ATTORNEY.

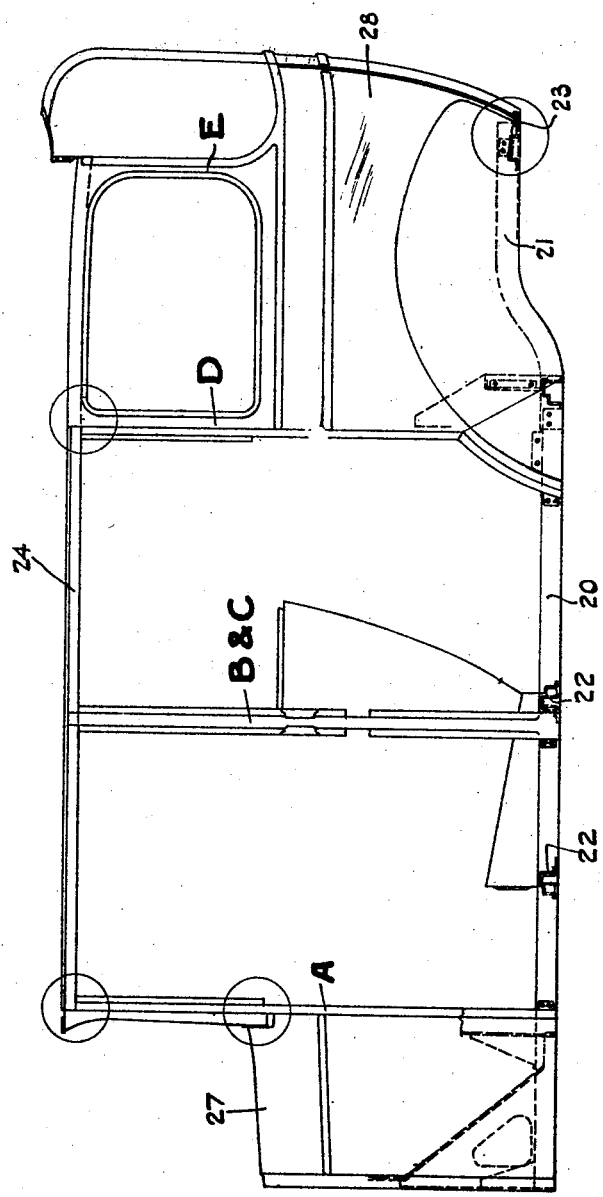

April 21, 1931.   J. LEDWINKA   1,801,869
PRESSED METAL AUTOMOBILE BODY
Filed Oct. 20, 1926   3 Sheets-Sheet 3

INVENTOR.
JOSEPH LEDWINKA
BY John P. Tarbox
ATTORNEY.

Patented Apr. 21, 1931

1,801,869

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED-METAL AUTOMOBILE BODY

Application filed October 20, 1926. Serial No. 142,819.

The invention relates to pressed metal vehicle bodies and, more particularly, to bodies of the closed type, although it will be understood that certain features of the invention may be utilized in bodies other than the closed type.

It is an object of the invention to improve the skeleton framework of the pressed metal body, particularly at certain points thereof, to increase the strength and rigidity of the framework at large, yet without substantial increase in weight.

It is a further object of the invention to provide an improved form of rear cross sill which lends itself readily to the support of the rear seat structure and to the attachment of the body to the chassis frame of the vehicle.

It is a still further object of the invention to provide an improved construction of the A post at the upper end whereby an integral portion of said post structure forms the side of the visor and forms a widened base to support the roof structure.

It is a still further object of the invention to provide an improved windshield header construction whereby is attained a simplified manner of supporting a baffle plate and instrument board.

It is a further object of the invention to provide a simplified construction of baffle plate and instrument board.

Further objects and advantages will become apparent from the following description in connection with the accompanying drawings in which—

Figure 1 represents in side elevation a pleasure car body (the roof being omitted), in which the features of the invention are embodied;

Fig. 2 is an enlarged fragmentary view in side elevation of the upper portion of the A post;

Fig. 3 is an enlarged fragmentary view in side elevation of the upper portion of the D post showing its connection to the top rail;

Fig. 4 is a fragmentary sectional view through the rear cross sill at the point of connection to the chassis frame;

Fig. 5 is a section through the lower windshield header and baffle plate and instrument board;

Figure 6:
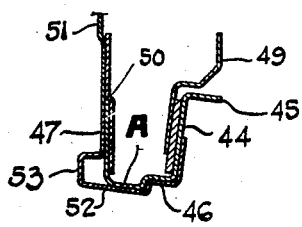
Figure 7:
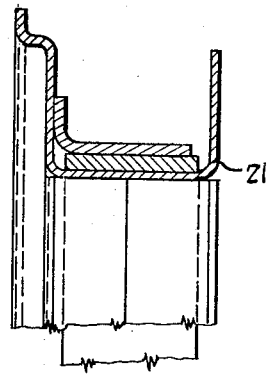
Figure 8:
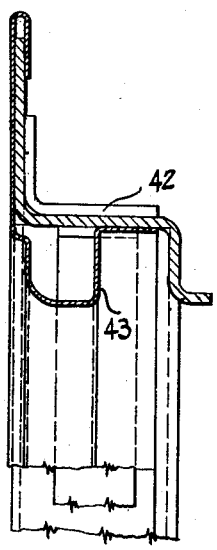
Figure 9:
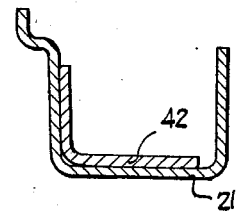
Figure 10:
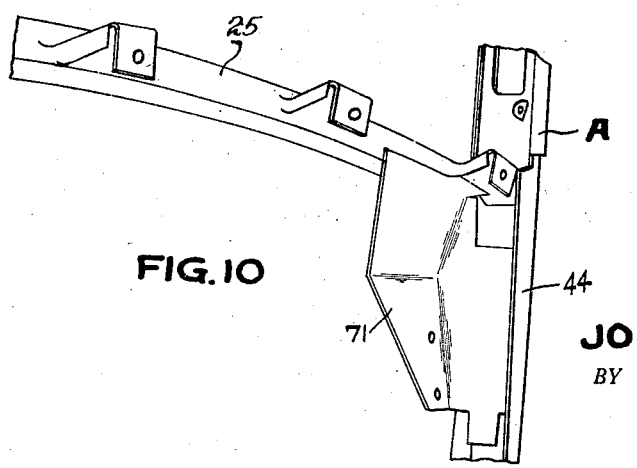

Figs. 6 and 7 are detail sectional views taken, respectively, on the lines 6—6 and 7—7 of Fig. 2 and looking in the direction of the arrows; Fig. 7 is shown on an enlarged scale;

Figs. 8 and 9 are detail sectional views taken, respectively, on the lines 8—8 and 9—9 of Fig. 3, looking in the direction of the arrows; and Fig. 10 is a perspective view looking inside the cowl, and showing the supporting means for the combined baffle plate and instrument board.

The skeleton framework of the body comprises main body side sills 20, tonneau side sills 21, main body cross braces, a tonneau rear sill 23, front intermediate and rear body posts, A, B—C, D, a tonneau post E, body top rails 24, a lower windshield header 25, an upper windshield header, 26, both extending between the A or front posts and a system of connecting and bracing these parts, certain of which are to be more particularly described and claimed herein as forming novel features of this invention.

The outer shell structure which is connected to the skeleton frame comprises the cowl panel 27 connected to the body sills and the A posts, the tonneau rear and quarter paneling designated generally 27 and interconnecting commonly the D posts, the tonneau side and rear sills, 21, 23 and the top rails 24. A peak panel or header 26 connects the A posts above the windshield opening. The roof structure interconnecting the peak panel 26, top 24 and forwardly arched over top of the tonneau panel 28 is not shown.

According to the invention of copending application, Ser. No. 530,144, filed Jan. 18, 1822, such body may be constructed in unit sub-assemblies as follows which are joined together in final assembly to form a rigid strong body structure. Such units comprise a cowl unit including the A posts, a tonneau unit including the D posts and an intermediate side unit each comprising a top rail, a body side sill and an interconnecting B—C post. While certain features of this invention are of especial utility in connection with a body constructed of such unit subassemblies, the features of the invention are in general applicable also to bodies constructed by other methods.

As clearly appears from Figs. 1 and 4, the tonneau rear sill 23 is of inverted channel section, the bottom 29 of the channel thus being available to provide a support for the rear of the seat pan (not shown). In order that the inclined seat pan may rest flatly upon the bottom 29 of the channel, the bottom is inclined rearwardly and downwardly. The sill 23 is provided with the lateral flanges 30 and 31 extending, respectively, forwardly and rearwardly of the body and the rearward flange 31 is reinforced at its edge, which is curved to conform to the body lines of the tonneau panel 28, with a flange 32. The tonneau panel is flanged under the sill at 33 and secured by welding.

A strong connection is provided between the tonneau side sills 21 and the rear sill 23. The side sills are of angle section, and the ends of the rear sill 23 rest within the angle, the flanges 30 and 31 engaging the horizontal arm of the side sills and being secured thereto, as by welding. To further strengthen the connection, an angle bracket 32 is secured by suitable means, such as riveting or welding, to the vertical branch of the side sill and to the bottom 29 of the channel of the sill 23.

At the points of connection to the chassis frame the flanges 30, 31 of the sill are offset upwardly, as at 34, and a securing plate 35 is fastened in said offsets and bridges the channel of the sill. Around the securing bolt hole for securing the body to the chassis frame, a reinforcing plate 36 is provided and, above this bolt hole, a hole is cut in the channel bottom to permit access for securing the body to the chassis.

Further features of the invention reside in the structure of the top rails 21 and in the joints between them and the A and B—C posts.

According to this invention the top rail 24 extends from the A post to the E post and consists of a single unitary stamping, the forward portion thereof extending between the A and D posts being generally of channel cross section and the rearward portion extending from the D to the E post being generally of angle cross section in the form of a double Z. The main body of this rearward portion is offset downwardly as indicated at 37 to take care of the difference in height of the tops of the door opening in front of the D post and the tonneau side window opening.

The joint at the D post between it and the top rail is made very rigid and strong and rendered capable of taking the jolting and wearing strains to which such bodies are subject. To this end two angle brackets are made use of. The one 38 has its vertical arm rigidly secured as by rivets, to the inside of the forward side of the channel forming the D post. This arm also provides an offset portion 39 to receive the hinge. The horizontal arm 40 is short and is secured as by riveting to the bottom of the channel of the top rail 21. The other angle bracket 41 has its vertical arm secured to the outside face of the rear side of the D post channel and its horizontal arm to the offset main body portion of the angle shaped rear portion of the top rail. To render the connection additionally strong, an angle bracket 42 is nested within the angle of the top rail and extends across the offset portion of the rail in the vicinity of the D post, the bracket being correspondingly offset. As shown, the same securing rivets are used to secure the brackets 38, 41 and 42 to the top rail. The paneling 28 is clinched over the top edge of the top rail in the rear of the D post and bent around to form one side of the window guide at 43, the edge thereof being secured at the bottom of the window guide to the top rail. The top rail forms the other side of the window guide.

The A post proper is also of generally channel shape in cross section, the channel presenting inwardly as shown in Fig. 6. As there shown, the A post structure is shown as comprising a main stamping 44 of channel shape, the rearward side of the channel having a rearwardly extending reinforcing flange 45. The stamping is provided with a rabbet 46 to receive the door opening.

To provide a strong connection between the A post and the top rail 21, an angle bracket 48 has its vertical arm secured as by rivets to the inside surface of the rear wall of the post channel stamping and its horizontal arm overlying the bottom wall of the top rail and secured thereto. For further strength, a second angle bracket 47 has its vertical arm secured as by welding, to the forward wall of the post channel, and a horizontal arm thereof overlying the horizontal arm of angle bracket 48 and like it, secured to the top rail. The two brackets 47 and 48 are, as shown, connected to the top rail by the same set of rivets.

Element 49, Fig. 6, is a bracket secured as by welding, to the upper end of the post and adapted to secure a finishing strip.

The angle bracket 47 has yet another function. Its vertical arm extends inwardly beyond the channel stamping of the A post and is forwardly offset at 50 to bring its inner portion flush with the forward wall of the A post stamping 44. The transversely extending peak panel 51 is secured to the inwardly extending portion, as by welding, the end of the peak panel abutting the edge of the panel stamping 52 forming the outside surface of the A post structure.

This panel stamping 52 is wrapped around the main A post stamping 44 as shown in Fig. 6, conforming generally to the contour of the A post stamping 44, but near the top of the A post, as shown in Figs. 2 and 6, is formed into a forwardly projecting portion 53 of U or channel shaped section, the depth of the U increasing gradually from bottom to top. The forward edge of the panel stamping inwardly of this forwardly extending portion 53 lies flush with and is secured, as by welding to the forward wall of the stamping 44, the edge abutting the edge of the peak panel 51 in this region of the post and being connected thereto as by seam welding. A horizontal portion 51a of the peak panel is extended laterally beyond the vertical portion and rests on the top of the forward extension 53 of the post paneling 52. The forward extension 53 thus provides a pleasing appearance to the side of the visor and serves as a buttressing support for the peak panel and the roof structure.

Another feature of the invention relates to the construction of the lower windshield header and the support for the baffle plate and instrument board, as well as to a simplified construction whereby the baffle plate and instrument board are made as a single unitary stamping which may be attached either by the body builder, or shipped separate, and attached by the automobile manufacturer. These features of the invention are characterized by great simplicity of construction and use of manufacture.

Referring to Figs. 5 and 10, it will be seen that the transverse header connecting the A posts below the windshield opening is formed by flanging the rear edge of the cowl panel 27 upwardly at 54, then bending it back upon itself some distance as at 55, and then flanging it rearwardly, as at 56. To reinforce the edge of the panel so formed, a transverse member 57 rests upon and is secured to the rearwardly extending flange 56 and upon this is secured the bottom channel 62 receiving the edge of the windshield when in the lowered position.

To deflect the air rushing in when the windshield is raised downwardly and thus break its force a baffle is in some cases provided in bodies of this type. In the present instance, this baffle is combined with the instrument board, a single integral stamping 61 serving both purposes. The upper beaded edge 63 of this stamping is located some distance above the lower windshield header and is curved rearwardly and downwardly a short distance at 64, then extends substantially vertically, at 65, then curves forwardly, at 66, then extends in a forwardly and downwardly inclined direction at 67, then is curved downwardly and rearwardly to form a strengthening bead 68 and finally extending rearwardly and downwardly at 69 to provide the surface for the instrument board, which is formed at the bottom with a reinforcing flange 70 at its lower edge.

To support the stamping 60 in spaced relation to the header the transverse member 70 has integrally formed therewith, rearwardly projecting lugs 58, generally of channel section for strength, and provided at their rear ends with downwardly extending flanges 59. The stamping 60 is secured to these flanges 59 by suitable securing means, such as the bolts 61.

To steady and support the sides of the stamping 60 it is secured to the A posts, through the brackets 71, shown in Fig. 10 as secured to the A posts and to the windshield header, as by welding.

In the foregoing description there has been set forth a body construction which makes for simplicity of construction, ease of assembly, a reduction in the cost of manufacture, yet one which possesses great strength and is capable of withstanding the wracking and weaving strains to which such bodies are subject. Thus are attained the principal objects of the invention.

In the annexed claims, I desire to claim all modifications of my invention which fall within the purview of its generic spirit.

What I claim is:

1. A pressed metal vehicle body having a side sill of inwardly and upwardly presenting angle section, a cross sill of inverted channel section having lateral flanges extending from its sides throughout the length thereof, said flanges overlapping and being secured through said overlapping portions to one branch of the angle of said side sill, and the bottom of said channel being laterally extended and secured through said extension to the other branch of the angle of said side sill.

2. A pressed metal vehicle body having, a cross sill of inverted channel section having side flanges, a flat member bridging the channel and secured to the side flanges, said member providing means for attachment of the body to a chassis frame.

3. A pressed metal vehicle body having, a cross sill member of inverted channel section, the side of said channels being provided with flanges having upward offsets, and a plate for securing the body to a chassis, said plate bridging the channel and secured at its ends in said offset portions.

4. In a pressed metal vehicle body, a body post, an angle-section top rail supported thereby and having its bottom wall offset longitudinally at the post, an angle bracket securing said top rail to said post, and an angle reinforce nested in the angle of said top rail to strengthen it in the region of said offset and its joinder with the body post.

5. In a pressed metal vehicle body, a body post of channel section, a top rail supported thereby, angle brackets having vertical portions secured respectively to the sides of said channel and horizontal portions arranged in overlapping relation and commonly secured to the top rail.

6. In a pressed metal vehicle body, an A-post structure comprising a hollow post and paneling secured to the post and having a forward extension of U-section at the top, the depth of the U increasing gradually from bottom to top.

7. In a pressed metal vehicle body, a body post of channel section, the channel presenting inwardly, and a reinforcing member secured to the inside of the forward wall of the channel, and having a forwardly offset inward extension, and a peak panel secured to said offset extension.

8. In a vehicle body, a pressed metal A-post structure comprising a hollow post and paneling applied thereto, said paneling having a hollow forwardly extending portion at the top applied mouth down upon the post, and gradually decreasing in depth from the top downwardly.

In testimony whereof he hereunto affixes his signature.

JOSEPH LEDWINKA.